United States Patent [19]

Carey

[11] Patent Number: 5,042,543
[45] Date of Patent: Aug. 27, 1991

[54] DOOR HINGE TEMPLATE FOR USE WITH A ROUTER

[76] Inventor: John R. Carey, 1996 Milford Pl., El Cajon, Calif. 92020

[21] Appl. No.: 577,296

[22] Filed: Sep. 4, 1990

[51] Int. Cl.$^5$ .......................... B27F 5/12; B27G 23/00
[52] U.S. Cl. ............................... 144/144.5 R; 33/197; 144/27
[58] Field of Search ............... 409/125, 130, 175, 178; 144/27, 144 R, 144.5, 144.56 T; 33/197

[56] References Cited

U.S. PATENT DOCUMENTS

| | | | |
|---|---|---|---|
| 3,559,704 | 2/1971 | Thompson | 33/197 |
| 3,738,013 | 6/1973 | Gregory | 144/27 |
| 4,553,336 | 11/1985 | Ponce | 144/27 |
| 4,914,822 | 4/1990 | Wetherington | 33/197 |

Primary Examiner—W. Donald Bray
Attorney, Agent, or Firm—Charles C. Logan, II

[57] ABSTRACT

A door hinge template that is used with a router to form the recess in a door jamb and also a recess in the edge of a door so that a door hinge can be installed. The door hinge template has been designed to be used with 1⅜ inch doors and 1¾ inch doors. The template has integrally formed captive nail assemblies for mounting the template to either a door jamb or the edge of a door. Two sets of alignment windows in the bottom wall of the template allow it to be either visually aligned or allow the alignment to be felt by handtouch. Removable spacer members allow the rectangularly shaped aperture in the central portion of the template to be adjusted so that it can be used for routing a recess for either 3½ inch hinges or 4 inch hinges.

5 Claims, 1 Drawing Sheet

DOOR HINGE TEMPLATE FOR USE WITH A ROUTER

BACKGROUND OF THE INVENTION

The invention relates to a template and more specifically to one that is used when hanging doors.

Presently most door hinges are either 3½ inch hinges or 4 inch hinges. They are set in the door jambs and in edge surfaces of doors in recesses that have been formed by routing. It is extremely important that the recesses be properly located on both the door jamb and the side edge of the door. There are presently existing several templates that are used when mounting door hinges. Most of these have comparatively expensive movable stop structures incorporated into their design.

It is an object of the invention to provide a novel door hinge template for use with a router that has been designed in a manner that makes it economical to form it from plastic material in an injection mold.

It is also an object of the invention to provide a novel door hinge template for use with a router that has integral nail holder structure for temporarily securing the template to either a door jamb or the edge of a door.

It is another of the invention to provide a novel door hinge template for use with a router that has the versatility to be utilized with 3½ inch hinges or 4 inch hinges that may be mounted to either a 1⅜ inch door or a 1¾ inch door.

It is an additional object of the invention to provide a novel door hinge template for use with a router that can be economically manufactured and marketed.

It is a further object of the invention to provide a novel door hinge template for use with a router that is made in such a manner that all of its sections have a thickness of ⅛ inch in order to accomplish a product free from distortion and imperfections.

SUMMARY OF THE INVENTION

Applicant's novel door hinge template for use with a router has been designed so it can be integrally injection molded from plastic material. All of its sections have a thickness of ⅛ inch in order to accomplish a product free from distortion or imperfections. It is also designed to be rigid under these strict requirements of the thickness of plastic molding.

The template has been designed to be used with two different sized hinges, the 3½ inch hinge and the 4 inch hinge. The central portion of the template has a major cutout aperture in the bottom wall of the template and vertical walls standing upwardly around its perimeter form a frame around which a router blade may travel to cut the recess in the door jamb and side edge of the door. Unique spacer members can be removably inserted into the respective front and rear edges of the major cutout aperture to adjust its opening size from that required for 4 inch hinges to 3½ inch hinges. The dimensions of the major cutout aperture take into account the required 1/16 inch radius difference between the collar of the router and the router blades.

The door hinge template has a front edge, a rear edge, a right edge, and a left edge. When using the template to locate where the router will form the recess for the door hinge, the right edge of the template is positioned inwardly on the door jamb and moved to a position which allows it to be either visually aligned or aligned by touch feel through one of the two pairs of alignment windows of the template. The first pair of alignment windows have an alignment edge that is located 1⅜ inches from the right edge of the template. The second set of alignment windows has its alignment edge spaced 1¾ inches from the right edge of the template. Once the user of the template has it properly aligned, they tap in top and bottom nails that are integrally mounted in their respective nail holder housings. Following this the router is moved along the inner perimeter of the major cutout aperture to cutout the proper size recess for the door hinge. Next the orientation of the template is rotated 180 degrees and one of the two sets of alignment window edges are positioned flush against the edge of the door. The particular set of alignment edges used depends on whether the door is a 1⅜ inch door or a 1⅜ inch door. Once properly aligned the nails of the captive nail assemblies are pounded into the edge of the door and it is ready to have the router form the recess therein.

The novel template has also been designed so that two or three of the templates can be connected together with ½ inch plywood strips to form them into a complete door template. The structure which allows this to occur are the laterally extending flanges on the left edge of the template adjacent both the front and rear portions and also the central portion. Each of these flanges has a pair of apertures through which nails can be driven to attach them to the ½ inch plywood strips.

The vertical side walls of the template in the front and rear portions add rigidity to the template and also form a rigid fulcrum for a claw hammer to pull the captive nails when removing them from either the edge of the door or the door jamb.

DESCRIPTION OF THE PREFERRED EMBODIMENT

Figure 2:
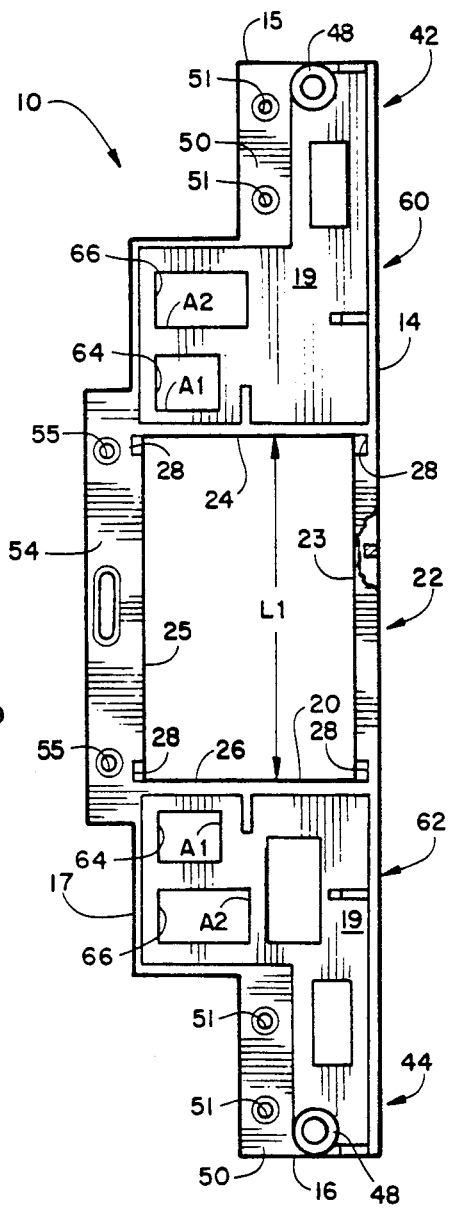
FIG. 2 is a top plan view of the door hinge template.
Figure 3:
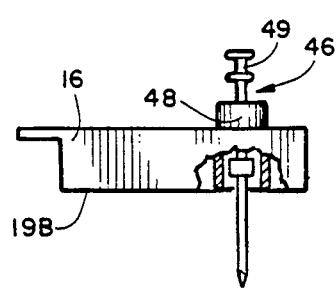
FIG. 3 is a rear end elevation view of the door hinge template with a portion broken away.

Applicant's novel door hinge template for use with a router will now be described by referring to FIGS. 1-3 of the drawing. The template is generally designated numeral 10.

Template 10 has a longitudinally extending body member 12. It has a right edge 14 that runs parallel to the longitudinal axis of body member 12. It also has a front edge 15, a rear edge 16 and a left edge 17. A bottom wall 19 extends the length of the template and it has a major cutout aperture 20 in central portion 22. Bottom wall 19 has a top surface 19A and a bottom surface 19B.

Vertically upstanding walls 23, 24, 25 and 26 form a frame around major cutout aperture 20. Recesses 28 are formed adjacent the top edges of vertical walls 23 and 25 for detachably receiving the flanges 29 on spacers 30. Each of these spacers has a horizontal top wall 32, a downwardly extending vertical wall 33 and reinforcing ribs 34. The spacers are removably inserted into recesses 28 when a 3½ inch hinge is being mounted. When the spacers are not being used, they are removably mounted in their respective receptacles along right edge 14 so that their flanges 29 are frictionally captured in notches 40.

Front portion 42 and rear portion 44 are substantially identical and they each have a captive nail assembly 46 integrally formed therein. The captive nail assembly has a cylindrical nail holder housing 48 and a doubleheaded nail 49 is captured therein. Front portion 42 and rear portion 44 also each have laterally extending flanges 50 with longitudinally spaced apertures 51 therein. Flanges 50 along with flange 54 and its apertures 55 are utilized to attach the door hinge template to a strip of ½ inch plywood so that two or three of the door hinge templates can be secured together to form a door template.

Front intermediate portion 60 and rear intermediate portion 62 each have an alignment window 64 and 66. They have respective alignment edges A1 and A2 that are used to visually align or to align the template by feel on a door jamb or the edge of a door.

Figure 1:
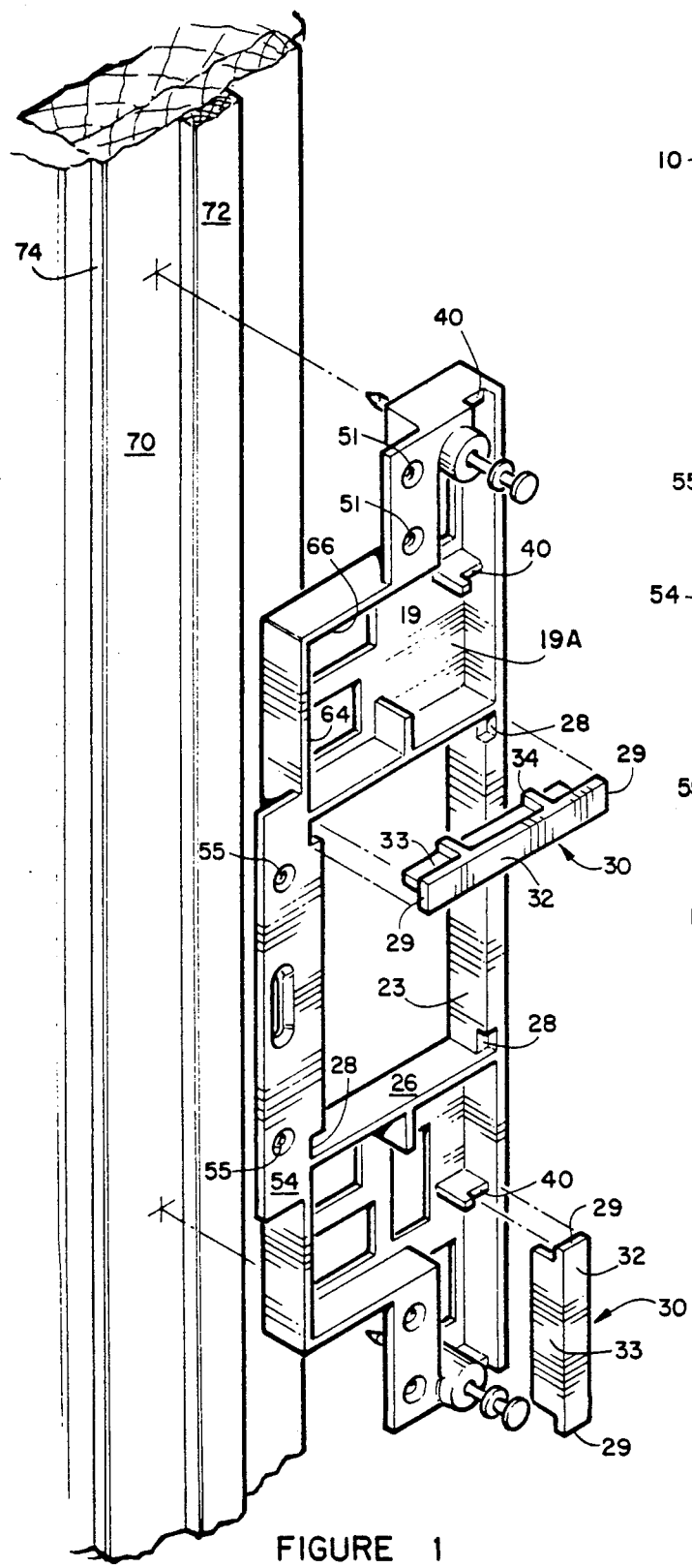
FIG. 1 is a front perspective view illustrating the manner in which the door hinge template is aligned with a door jamb.

The manner in which the door hinge template 10 is used with a door jamb 70 is illustrated in FIG. 1. The doorjamb has a door stop strip 72 and a left edge 74. If a 1¾ inch door is being mounted, alignment edges A1 of alignment windows 64 are aligned either visually or by touch with left edge 74. Once that step is done, the nails 49 are nailed into the door jamb 70. Next a router is moved around the interior of major cutout aperture 20 to form the recess in the door jamb for the hinge.

What is claimed is:

1. A door hinge template for use with a router comprising:
    an elongated body member having a longitudinally extending axis, said body member having a substantially horizontally oriented bottom wall having a top surface, a bottom surface, a front edge, a rear edge, a left edge and a right edge;
    said body member having sequentially from front to rear a front portion, a front intermediate portion, a central portion, a rear intermediate portion, and a rear portion;
    said central portion having a rectangularly shaped aperture in said bottom wall that has a predetermined longitudinal length L1 which allows a door hinge recess to be routed in a door jamb and the edge of a door, vertical walls extend upwardly from the entire perimeter of said rectangularly shaped aperture to form a rectangular frame;
    a vertical wall extends upwardly along said bottom wall from its front edge to said central portion and from its rear edge to said central portion to define the right edge of said template;
    a first pair of alignment windows formed in the bottom wall of said respective front and rear intermediate portions, said windows each having a longitudinally extending alignment edge A1 that is located 1¾ inches from the right edge of said template;
    a second pair of alignment windows formed in the bottom wall of said respective front and rear intermediate portions, said windows each having a longitudinally extending alignment edge A2 that is located 1⅜ inches from the right edge of said template; and
    a captive nail assembly mounted in said front portion and said rear portion for temporarily securing said template to a door jamb or edge of a door while a recess is routed out for a door hinge.

2. A door hinge template as recited in claim 1 wherein the thickness of said bottom wall and said vertical walls of said template are substantially equal.

3. A door hinge template as recited in claim 1 wherein the components of said template are integrally formed as a single injection molded plastic member.

4. A door hinge template as recited in claim 1 further comprising laterally extending flanges on the left edge of said front portion, and said rear portion, a laterally extending flange on the left edge of said central portion, and a predetermined number of apertures in said flanges so that they can be secured to a piece of ½ plywood strip that makes it possible to connect two or three of the door hinge templates together to form a full length door template.

5. A door hinge template as recited in claim 1 further comprising means for adjusting the length of the rectangularly shaped aperture in said central portion.

* * * * *